United States Patent

Moulton

[11] 3,874,623
[45] Apr. 1, 1975

[54] COOKING APPLIANCE

[76] Inventor: Ronald D. Moulton, 4582 Russell St., Salt Lake City, Utah 84117

[22] Filed: June 18, 1973

[21] Appl. No.: 371,001

[52] U.S. Cl. ............ 248/121, 16/114 A, 126/30, 248/156
[51] Int. Cl. ............................................ A47g 29/14
[58] Field of Search .......... 248/156, 150, 152, 121, 248/309, 311; 126/30; 16/114 A, 114 R

[56] References Cited
UNITED STATES PATENTS

| | | | |
|---|---|---|---|
| 865,917 | 9/1907 | Koehnlein | 16/114 A |
| 906,986 | 12/1908 | Anderson | 16/114 A |
| 1,022,978 | 4/1912 | Stevenson | 16/114 A |
| 1,189,957 | 7/1916 | Jewell | 16/114 A |
| 1,452,640 | 4/1923 | Hulick | 248/121 |
| 2,249,144 | 7/1941 | Kleina | 16/114 A |
| 2,262,339 | 11/1941 | Shaffer | 16/114 A |
| 2,730,263 | 1/1956 | Neilson | 248/311 |
| 3,273,841 | 9/1966 | Cota | 248/156 |
| 3,335,988 | 8/1967 | Herrick | 248/121 |
| 3,455,291 | 7/1969 | Glass | 126/30 |

FOREIGN PATENTS OR APPLICATIONS

| | | | |
|---|---|---|---|
| 982,270 | 1/1951 | France | 248/156 |

*Primary Examiner*—Marion Parsons, Jr.
*Attorney, Agent, or Firm*—H. Ross Workman

[57] ABSTRACT

A novel cooking appliance which provides a highly compact and collapsible holder for an open can or cookware. The cooking appliance accommodates a wide variety of container sizes and securely retains the container on a bracket which may be suspended over an open fire or other heat source. In addition, the cooking appliance provides a handle for convenient and safe removal of the holding apparatus and container from its suspended position over a heat source.

9 Claims, 2 Drawing Figures

3,874,623

COOKING APPLIANCE

BACKGROUND

1. Field of the Invention

This invention relates to cooking apparatus and more particularly to apparatus for holding an open container over a source of heat.

2. The Prior Art

A wide variety of holders, clamps and hooks exist in the prior art for suspending or positioning cooking utensils over an open fire. A major limitation observed in the prior art is the inability of utensil-holding devices to attach securely to open containers which have the significant variations in diameter and height such as now exist in food packaging cans.

Examples of prior art holding devices are shown in U.S. Pat. Nos. 1,452,640 and 3,335,988. The prior art shows holders which will accommodate only a certain type of cooking utensil and only a limited variation in the vertical dimension of the utensil.

Another problem associated with the heating of an opened can over a fire is the removal of the can from the fire after it has been sufficiently warmed. The prior art shows permanently attached handles or rotation of the holding apparatus about a vertical stake. The major problem associated with permanently affixed handles is that the fire heats the handle as well as the can and makes it difficult to use the handle to remove the cooking container from over the fire. The rotatable suspension system conventionally does not provide for completely removing a hot container from the holding apparatus and only serves to move the container to a more distant position with respect to the fire.

With the significant increase in camping and backpacking activities by the general public, it has become desirable to employ an inexpensive, compact and collapsible open container holder for heating the contents of the container over a heat source such as an open fire. Until the present invention, the heating of an open container over an open fire while camping was often a dangerous and difficult activity.

BRIEF SUMMARY AND OBJECTS OF THE INVENTION

The present invention comprises novel cooking apparatus having connecting structure which will securely retain cans and cookware having a wide variety of sizes and configurations. The can and associated connecting structure are unitarily removable from a supporting bracket by a removable handle. In one embodiment of the invention, the connecting assembly is selectively rotatable about a generally vertical axis into and out of the heat of an open fire.

It is, therefore, a primary object of this invention to provide an improved cooking appliance.

Yet another object of the present invention is to provide a highly compact and collapsible can warming device capable of accommodating a wide variety of container sizes.

These and other objects and features of this invention will become more fully apparent from the following description and appended claims taken in conjunction with the accompanying drawings.

DETAILED DESCRIPTION OF THE PREFERRED EMBODIMENTS

Although the invention shown in FIG. 1 may be used for holding any type of cooking container, including standard cooking utensils, the present invention will be described, for simplicity, in connection with its use with an open can.

Figure 1:
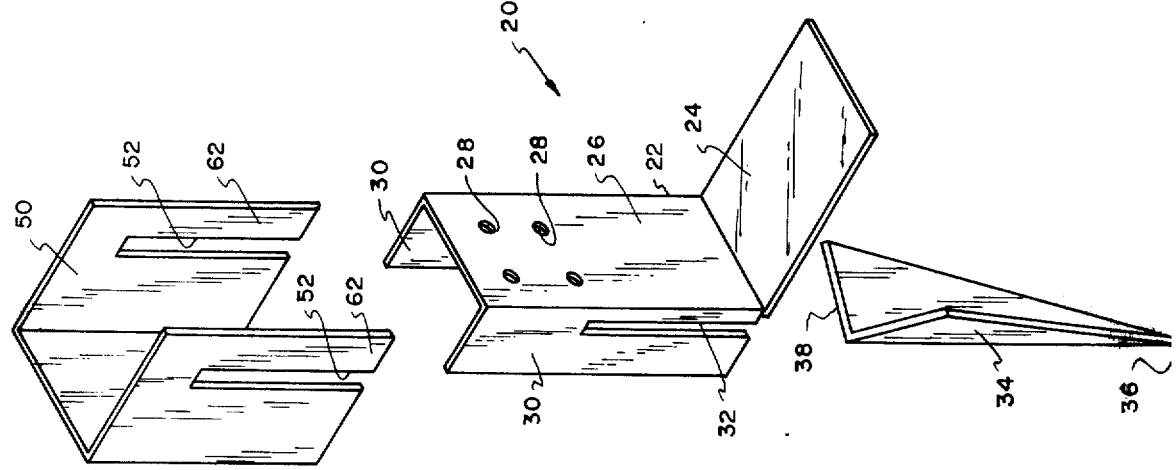
FIG. 1 is an exploded perspective illustration of a presently preferred embodiment of the invention.
Figure 1:
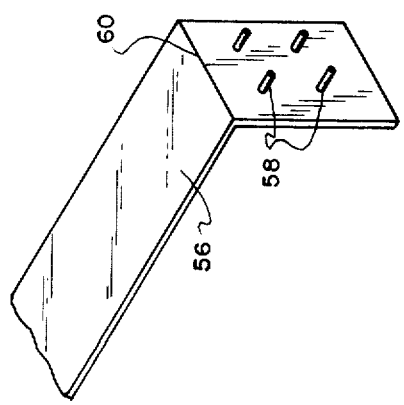

According to one presently preferred embodiment of the invention illustrated in FIG. 1, an outdoor cooking appliance 20 is provided. The appliance includes a container holding bracket 22 providing support for a suitable open container. The holding bracket 22 is generally U-shaped in cross-sectional configuration, the central plate 26 being continuous with rearwardly projecting arms 30.

A heat distribution flange 24 is integral with and extends perpendicularly from the base of the container holding bracket 22. The heat distribution flange 24 fulfills a dual function. First, it distributes the heat from the fire over the bottom of the can and, secondly, it vertically retains the can with respect to the container holding bracket 22. Of course, the heat distribution flange 24 could be shortened to a point where it only provides vertical support and does not distribute heat over the bottom of the container. Such a dimensional alteration would be desirable if the outdoor cooking appliance 20 were to be used only in connection with a standard cooking utensil which presents a bottom of sufficient thickness to distribute the heat. The bottom of a standard food container is normally not of a thickness or material which readily accommodates even heat distribution; therefore the flange 24 is useful to distribute the heat evenly along the bottom of the container.

The central plate 26 presents a plurality of spaced apertures 28 which accommodate the removable attachment of a handle to the container holding bracket 22. It should be recognized that for maximum stability the central plate 26 should be of a vertical dimension which is greater than that of the open container to be retained in the cooking appliance. Furthermore, the width of the heat distribution flange 24 and the handle attachment plate 26 is not critical but should be sufficient to lend stability to the cooking appliance and to distribute heat over the bottom of the container.

Vertical support arms 30 are disposed at right angles to the central plate 26 and oriented perpendicular to the plane of the heat distribution flange 24. Each of the vertical support arms 30 presents a downwardly opening attachment slot 32. The slot 32 is preferably formed toward the forward edge of the vertical support brackets 30 and is of a sufficient length to eliminate any tendency toward forward rotation of the container holder bracket about supporting stake 34, as will be subsequently more fully described.

One presently preferred embodiment of a supporting stake is shown in FIG. 1. The stake 34 has a pointed end 36 which may be driven into the earth in order to stabilize the stake. The upper end 38 of stake 34 is formed in a V-shape, and each leg of the V may be accommodated in mating relation with the corresponding slot 32. Of course, the angle of the V formed by the upper end 38 of the stake 34 can be of any suitable magnitude.

Figure 2:
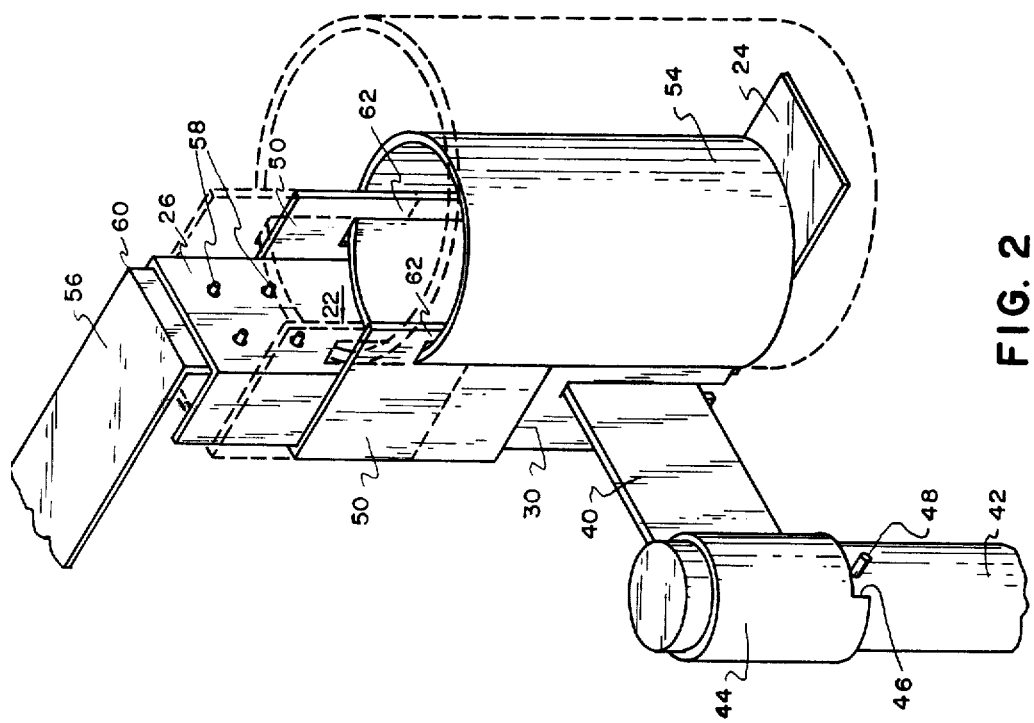
FIG. 2 is a perspective illustration of a second preferred embodiment of the invention, particularly showing the invention being used in connection with an open can.

Alternatively, the container holder bracket 22 may be supported by a single rigid arm 40 (see FIG. 2). The stake embodiment shown in FIG. 2 allows the container holder bracket 22 to be rotated about a cylindrical post 42. An annular sleeve 44 is integral with the arm 40 and has an inside diameter which is slightly greater than the diameter of post 42, so that relative movement of the sleeve 44 and post 42 is possible. Sleeve 44 has a semi-circular notch 46 along its bottom edge. A retaining pin 48 extends horizontally from the cylindrical post 42 and prevents the sleeve 44 from sliding downwardly along the length of the post 42. Additionally, the pin 48 allows rotation of the sleeve 44 only along an arc defined by the length of the semi-circular notch 46. The pin 48 could be of any suitable size and configuration and could be desirably replaced by a tapered post or an annular enlargement forming a part of the post. Alternatively, the sleeve 44 could be provided with a closed or tapered upper end to limit downward displacement upon the post. Clearly, the notch 46 could be omitted or fabricated in any desirable length about the circumference of the sleeve 44. Any change in the length of the notch 46 would simply result in a corresponding change in the limitation upon rotation of the container holding bracket 22 about the post 42.

With further reference to FIG. 1, slidable, generally U-shaped retaining sleeve 50 is illustrated. The retaining sleeve 50 is adapted to slide over the support arms 30 and engage the upper edge of a can 54 or other suitable container (see FIG. 2). The slidable retaining sleeve 50 presents two downwardly-directed slots 52 which releasably engage the upper edge of the open container 54 (see FIG. 2). The slots 52 must be sufficiently wide to accomodate the curved edges of the container. The slots 52 define tabs 62 which coact with the holding bracket 22 to secure the container 54 to the holding bracket. Clearly, a sleeve (not shown) with a smaller vertical dimension and depending tabs could be substituted for sleeve 50. It should be recognized that specially shaped notches 52 may be desirable for retaining containers having a peripheral lip of unconventional configuration.

A removable handle 56 has an L-configuration, the longest leg functioning as a handhold and the shortest leg projecting at right angles from the longest leg at joint 60. The short leg presents a plurality of projecting pins 58 each of which is sized and configurated to mate with the corresponding handle apertures 28 on the plate 26. The handle pins 58 are of sufficient length to achieve a binding connection within the apertures 28 when a lifting force is exerted through the handle 56 to the bracket 22.

FIG. 2 illustrates a completely assembled cooking appliance with an open container 54 as it would be in the can warming operation. It should be noted that the heat distribution flange 24 provides vertical support for the container 54 and the slidable retaining sleeve 50 provides horizontal support for the can 54. In addition, as shown in broken lines, the slidable retaining sleeve 50 may be positioned at various locations along the holding bracket 22 in order to accommodate varying sizes of open containers.

The invention could be used to hold open containers for purposes other than cooking, i.e. painting or mixing liquids. As previously indicated, the present invention has been described with reference to outdoor cooking for simplicity only. Thus, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A cooking appliance for securing a container having any one of a plurality of sizes such that the container is suspendable over a heat source, the appliance comprising:
   a stake;
   a rigid holding bracket removably attached to the stake and comprising an outwardly projecting flange upon which at least a portion of the peripheral edge of the container rests;
   a retaining sleeve slidably engaging the rigid holding bracket and comprising depending tabs for securing the container to the holding bracket; and
   handle means removably attachable to the holding bracket.

2. A cooking appliance as defined in claim 1 further comprising supporting means, the supporting means comprising means for releasably supporting the holding bracket in an elevated position.

3. A cooking appliance as defined in claim 2 wherein said holding bracket comprises opposed vertical support arms each presenting a vertically-oriented downwardly-opening slot for releasable engagement with the supporting means, each slot having substantially parallel sides and of sufficient length to substantially eliminate any tendency toward forward rotation of the bracket.

4. A cooking appliance as defined in claim 2 wherein said supporting means comprises:
   a post capable of being partially inserted into the earth so as to hold the post in a vertical position;
   a sleeve rotatably engaging the post near the top, the sleeve comprising an outwardly projecting arm configurated to releasably engage a slot in the holding bracket.

5. A cooking appliance as defined in claim 1 wherein the projecting flange of the holding bracket is elongated to distribute heat evenly over the bottom of the container and to simultaneously provide vertical support for the container.

6. A cooking appliance comprising: a holding bracket comprising:
   a rectangular face plate providing a plurality of apertures forming an attachment site for a lifting handle,
   a horizontal heat distribution plate rigidly affixed to the face plate along the lower edge of the face plate, and
   two vertical support arms oriented perpendicularly to the face plate along two sides of the face plate respectively, each support arm presenting an elongate, vertically oriented slot forming an attachement site for a supporting means;
   supporting means suspending the holding bracket in an elevated position;

a lifting handle comprising:
- a hand grip portion,
- an angled leg portion angularly disposed with respect to the hand grip portion, and
- a plurality of attachment pins oriented perpendicularly to the angled leg portion and configurated so as to couple in mating relation with the apertures on the face plate; and a slidable retaining bracket comprising:
- a back portion of a width slightly greater than the width of the rectangular face plate,
- two side members rigidly affixed to the ends of and generally perpendicular to the back portion and of a length substantially greater than the width of the holding bracket support arms, each side member presenting a downwardly opening elongate slot for engagement with the upper edge of an open cooking container.

7. A cooking appliance as defined in claim 6 wherein said supporting means comprises a stake, one end of which is capable of being partially inserted into the earth, the opposite end comprising an attachment site releasably engaging the slots on the vertical support arms.

8. A cooking appliance as defined in claim 6 wherein said supporting means comprises:
- a post capable of being partially inserted into the earth;
- a projection radially projecting from the post at a point near the top;
- an annular sleeve circumscribing the post near the top and resting upon the projection; and
- an arm integral with the sleeve and projecting therefrom, the arm comprising an attachment site releasably engaging the slots on the vertical support arms.

9. A cooking appliance as defined in claim 8 wherein said annular sleeve comprises a semi-circular notch on the lower end of the sleeve which acts, in combination with the projection, to restrict rotation of the sleeve to less than 360°.

* * * * *